United States Patent [19]
Wakana et al.

[11] Patent Number: 5,580,233
[45] Date of Patent: Dec. 3, 1996

[54] COMPRESSOR WITH SELF-ALIGNING ROTATIONAL BEARING

[75] Inventors: Tatuya Wakana; Koichi Inaba; Koichi Sekiguchi, all of Tochigi-ken; Atushi Shimada; Toshiyuki Terai, both of Tochigi; Nobuo Abe, Tochigi-ken; Kunio Fukami, Tochigi, all of Japan

[73] Assignee: Hitachi, Ltd., Tokyo, Japan

[21] Appl. No.: 523,129

[22] Filed: Sep. 5, 1995

[30] Foreign Application Priority Data

Sep. 16, 1994 [JP] Japan .................... 6-221801

[51] Int. Cl.⁶ .................................... F01C 21/04
[52] U.S. Cl. .................... 418/94; 418/55.6; 384/213
[58] Field of Search ............... 418/55.1, 55.6, 418/94, 270; 417/410.3, 423.12; 384/206, 213

[56] References Cited

U.S. PATENT DOCUMENTS

| | | | |
|---|---|---|---|
| 4,227,826 | 10/1980 | Conrad | 384/206 |
| 5,137,437 | 8/1992 | Machida et al. | 418/55.1 |
| 5,345,785 | 9/1994 | Sekigami et al. | 418/55.6 |
| 5,433,530 | 7/1995 | Waskiewicz | 384/206 |

FOREIGN PATENT DOCUMENTS 3-206388  9/1991  Japan .

*Primary Examiner*—Charles G. Freay
*Attorney, Agent, or Firm*—Antonelli, Terry, Stout & Kraus

[57] ABSTRACT

In a compressor, a lubricant groove for a contact area between a self-aligning spherical bearing and a housing therefor opens to a relatively low pressure chamber, but is prevented from opening to a relatively high pressure chamber, the housing has an arrangement for restraining a transmission of deformation and/or heat energy from a welded portion thereon to the contact area, and a main shaft, the housing, a housing lid and a pipe for lubricant circulation are coaxially arranged.

17 Claims, 10 Drawing Sheets

5,580,233

COMPRESSOR WITH SELF-ALIGNING ROTATIONAL BEARING

BACKGROUND OF THE INVENTION AND RELATED ART STATEMENT

The present invention relates to a compressor for compressing a fluid, preferable for an air-conditioner, a refrigerator or the like.

In a conventional compressor disclosed by JP-A-3-206388, a rotational shaft is supported by a pair of non-self-aligning bearings, and a lubricant feed pipe extends vertically from a frame fixed to a motor stator.

OBJECT AND SUMMARY OF THE INVENTION

An object of the present invention is to provide a compressor with high reliability and assembling facility.

According to the present invention, a compressor for compressing a fluid with a lubricant therein comprises a rotational shaft, a compression mechanism including a pair of compression members, at least one of which is driven by the rotational shaft to decrease a volume formed between the compression members so that the fluid and the lubricant in the volume is pressurized, a relatively high pressure chamber receiving the pressurized fluid and lubricant, a relatively low pressure chamber whose inner pressure is lower than that of the relatively high pressure so that the lubricant flows from the relatively high pressure chamber into the relatively low pressure chamber, a self-aligning rotational bearing supporting the rotational shaft therein and including a spherical outer surface, one of axial ends of the self-aligning rotational bearing facing to the relatively high pressure chamber, and another one of axial ends of the self-aligning rotational bearing facing to the relatively low pressure chamber, a self-aligning bearing housing including a spherical inner surface in which the spherical outer surface fits in a slideable manner, and a groove formed on at least one of the spherical inner and outer surfaces, which groove opens to the relatively low pressure chamber and is prevented from opening to the relatively high pressure chamber. The rotational shaft may rotate in the self-aligning rotational bearing, or alternatively, the self-aligning rotational bearing supporting the shaft therein may rotate in the self-aligning rotational bearing housing. The spherical surfaces described in this application may include a non-spherical, for example, cylindrical or flat surface therein as only a part thereof.

Since the groove formed on the at least one of the spherical inner and outer surfaces opens to the relatively low pressure chamber and is prevented from opening to the relatively high pressure chamber, the lubricant is sufficiently supplied to a contact area between the spherical inner and outer surfaces from the relatively low pressure chamber, and the fluid to be compressed is prevented from flowing into the contact area from the relatively high pressure chamber, so that a lubrication and a hermetic seal on the contact area by the lubricant are not deteriorated by washing-out of the lubricant from the contact area by the fluid.

The compressor may comprise a plurality of the grooves substantially symmetrical relative to the rotational axis. The bearing housing may include a hole whose diameter is not less than a radially outermost diameter of the spherical inner surface to keep a fluidal communication through the hole between the groove and the relatively low pressure chamber, so that the lubricant is stored in the hole to be stably supplied through the hole into the contact area. The groove may extend to the radially outermost portion of the spherical inner surface so that the lubricant is sufficiently supplied for at least one of the axial sides of the contact area. It is preferable that a radial distance between the groove on the spherical inner surface and a rotational axis of the rotational shaft is decreased from the relatively low pressure chamber toward the radially outermost portion of the spherical inner surface, or the groove extends substantially parallel to a rotational axis of the rotational shaft, so that the lubricant flow toward the at least one of the axial sides of the contact area is prevented from being restrained.

According to the present invention, in a compressor with the self-aligning rotational bearing, the self-aligning bearing housing, a container receiving the rotational shaft, the compression mechanism, the self-aligning rotational bearing and the self-aligning bearing housing, a support plate connecting the container and the self-aligning bearing housing, and a welded portion between the support plate and the self-aligning bearing housing, the welded portion is prevented from being arranged within an axial width of the at least one of the spherical inner and outer surfaces, so that a plastic deformation of the welded portion caused by welding process does not deteriorate a fitting condition of the contact area.

According to the present invention, in a compressor with the self-aligning rotational bearing, the self-aligning bearing, the container, the support plate, and the welded portion, the self-aligning bearing housing has a relatively flexible portion between the welded portion and the radially outermost portion of spherical inner surface, that is, within an axial region in which both the welded portion and the radially outermost portion of the spherical inner surface do not exist, a geometrical moment of inertia of area of the self-aligning bearing housing against a bending moment force around a transverse axis of a rotational axis of the rotational shaft at the flexible portion is smaller than a geometrical moment of inertia of area of the self-aligning bearing housing against the bending moment force around the transverse axis at the radially outermost portion of the spherical inner surface, so that the plastic deformation of the welded portion caused by the welding process does not deteriorate a fitting condition at the at least one of the axial sides of the contact area.

According to the present invention, in a compressor with the self-aligning rotational bearing, and the welded portion between the support plate and the self-aligning bearing housing, the self-aligning bearing housing has a (preferably, circumferential) groove opening radially between the welded portion and the radially outermost portion of the spherical inner surface, so that a thermal propagation from the welded portion to the at least one of the axial sides of the contact area causing a plastic undesirable deformation of the at least one of axial sides of the contact area is restrained by the groove, and the plastic deformation of the welded portion caused by the welding process is prevented by the groove from being transmitted significantly to the at least one of axial sides of the contact area. The groove may be arranged between the welded portion and an axial end of the spherical inner surface.

According to the present invention, in a compressor with the self-aligning bearing housing, the support plate and the welded portion, the self-aligning bearing housing has a thermal conduction throttle portion between the welded portion and the radially outermost portion of the spherical inner surface, that is, within the axial region in which both the welded portion and the radially outermost portion of the spherical inner surface do not exist, a cross sectional area of the self-aligning bearing housing along an imaginary radial plane at the thermal conduction throttle portion is smaller than a cross sectional area of the self-aligning bearing housing along the imaginary radial plane at the radially outermost portion of the spherical inner surface, so that the thermal propagation from the welded portion to the at least one of the axial sides of the contact area causing the plastic undesirable deformation of the at least one of axial sides of the contact area is restrained by the thermal conduction throttle portion. The cross sectional area of the self-aligning bearing housing along the imaginary radial plane at the thermal conduction throttle portion may be smaller than a cross sectional area of the self-aligning bearing housing along the imaginary radial plane at the welded portion, so that a heat energy by the welding is mainly absorbed by a part of the self-aligning bearing housing adjacent to or under the welded portion and is restrained from being transmitted to the at least one of axial sides of the contact area through the thermal conduction throttle portion.

According to the present invention, a bearing housing in a compressor includes an inner surface in which an outer surface of a bearing for supporting a rotational shaft fits, and a bearing housing lid covering an end of the bearing housing and including a pipe communicating fluidally with the inner surface to supply a lubricant to the inner surface through the pipe, the pipe including a substantially horizontally extending part, the bearing housing lid has a fitting surface substantially symmetrical relative to an axis, the bearing housing has another fitting surface substantially symmetrical relative to another axis, the fitting surface and the another fitting surface contact each other with coaxial relationship between the axis and the another axis to position the bearing housing lid radially relative to the bearing housing, and the axis and the substantially horizontally extending part of the pipe are substantially coaxial, so that a position of the substantially horizontally extending part of the pipe is not affected by a rotational position of the bearing housing lid relative to the bearing housing.

The another axis and the rotational axis of the shaft may be substantially coaxial, so that the position of the substantially horizontally extending part of the pipe is not affected by a rotational position of the bearing housing relative to the shaft. The pipe may have a substantially vertically extending part and a plastically bent part between the substantially vertically extending part and the substantially horizontally extending part, so that a position of a lower end of the substantially vertically extending part can be adjusted by a plastic bending for the plastically bent part regardless of rotational positions of the bearing housing and the bearing housing lid in the compressor. A lubricant path in the rotational shaft for supplying the lubricant to the compression mechanism and the substantially horizontally extending part of the pipe may be substantially coaxial so that the lubricant can flow straight from the pipe to the lubricant path regardless of rotation of the shaft.

DETAILED DESCRIPTION OF PREFERRED EMBODIMENTS

Figure 1:
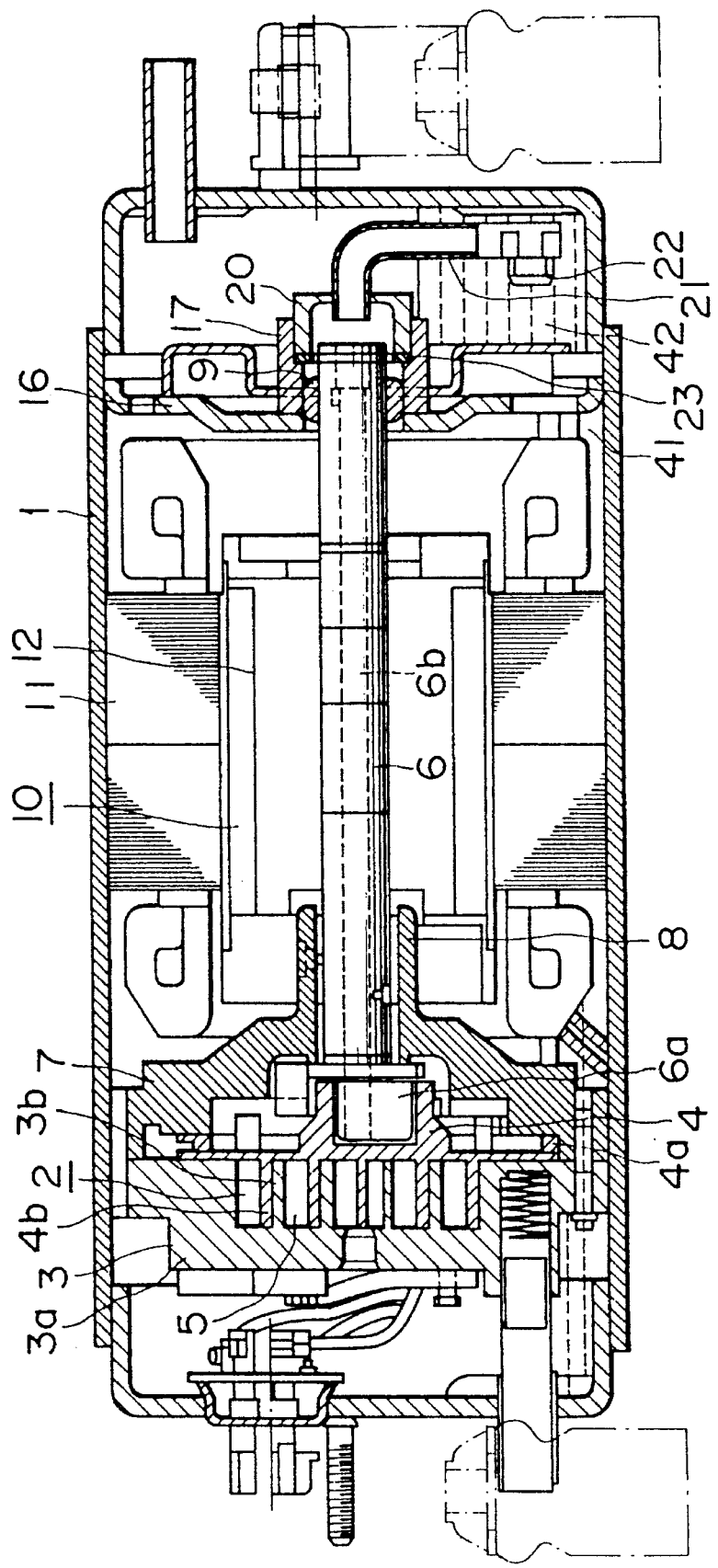
FIG. 1 is a cross sectional view of a compressor according to the present invention.

In a horizontal axis scroll compressor as shown in FIG. 1, a hermetically sealed container 1 receives a compression mechanism 2 and an electric motor 10 with a stator 11 and a rotor 12, and a scroll wrap 3b on an end plate 3a of a fixed scroll 3 mates with a scroll wrap 4b on an end plate 4a of an orbiting scroll 4 to form a variable compression volume 5 therebetween. The orbiting scroll 4 is driven by the electric motor 10 through an eccentric pin 6a of a rotational shaft 6 to orbit around a horizontal rotational axis of the shaft 6, and is prevented from rotating on its own axis by Oldham's coupling ring (not shown). A frame 7 fixed to the container 1 receives orbiting scroll 4, and supports fixed scroll 3. A main bearing 8 supports an end of the shaft 6 in a rotatable manner on the frame 7. A self-aligning bearing 9 whose substantially spherical outer surface 9a (which may include partially cylindrical-or-flat surface, or the claimed circumferential-or-axial groove 9b) fits in a substantially spherical inner surface 17b (which may include partially the claimed circumferential or axial groove) of a bearing housing 17 for self-aligning of the bearing 9 supports another end of the shaft 6 in a rotatable manner on a support plate 16 fixed to the container 1.

A relatively high pressure chamber 41 into which fluid and lubricant pressurized by the variable compression volume 5 are introduced communicates through flow throttle apertures of the support plate 16 with a relatively low pressure chamber 42 surrounded by the bearing housing 17, a bearing housing lid 20, a pipe 21 with a magnet lubricant cleaner 22 at an end thereof, the support plate 16 and the container 1. The lubricant flows from the relatively high pressure chamber 41 through the relatively low pressure chamber 42 and a coaxial lubricant path 6b in the shaft 6 to the main bearing 8, the eccentric pin 6a, the Oldham's coupling and so forth.

Figure 2:
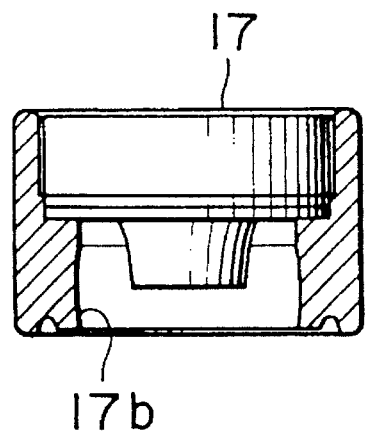
FIG. 2 is a cross sectional view of a bearing housing according to the present invention.
Figure 3:
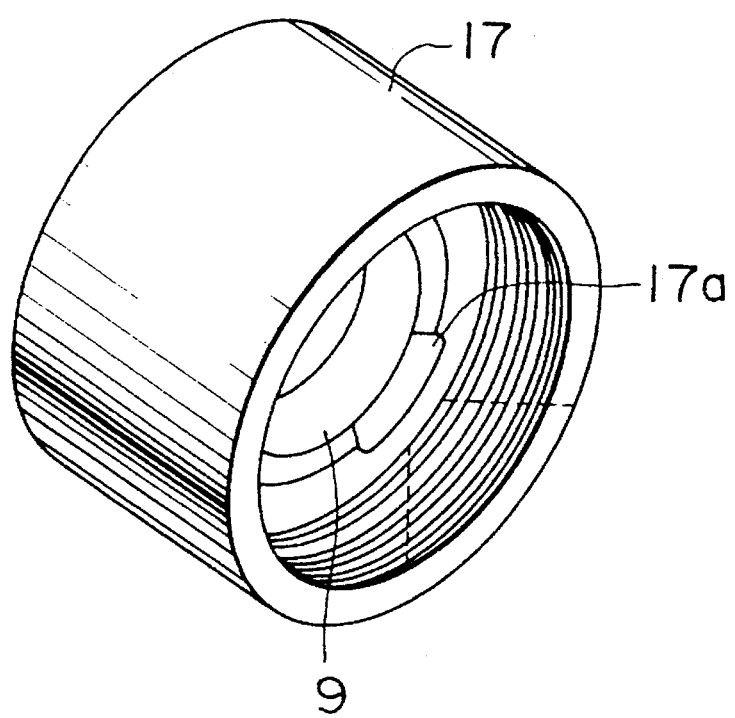
FIG. 3 is an oblique projection view of the bearing housing according to the present invention.
Figure 6:
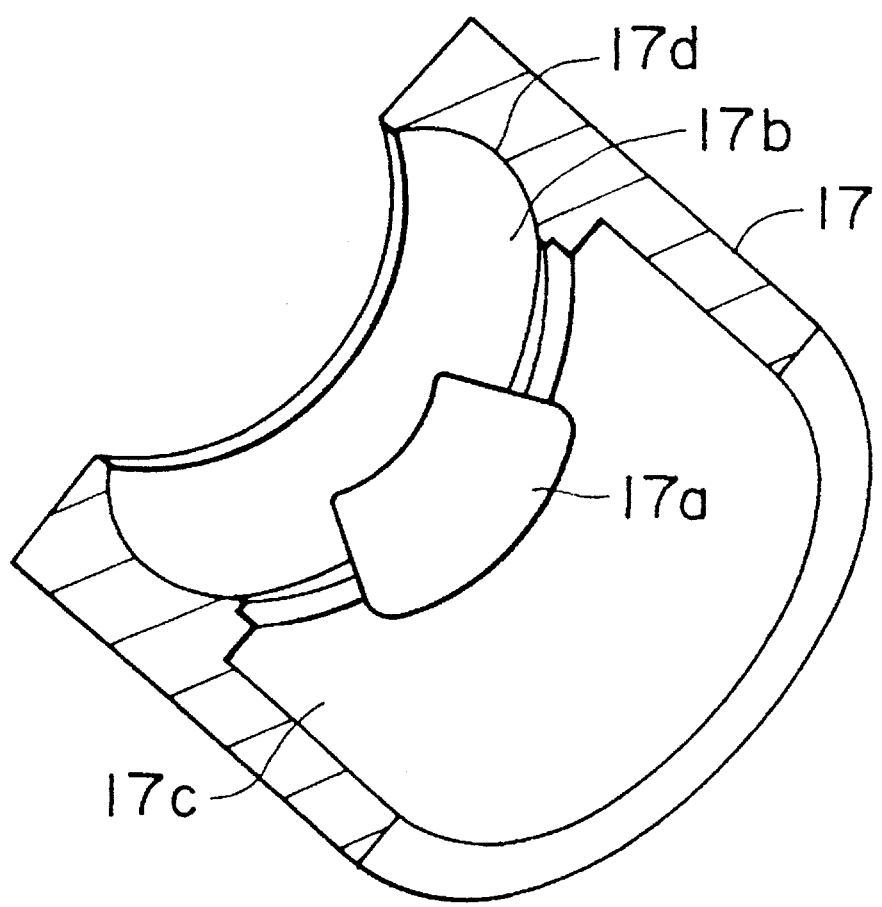
FIG. 6 is an obliquely seen cross sectional view of the bearing housing according to the present invention.
Figure 10:
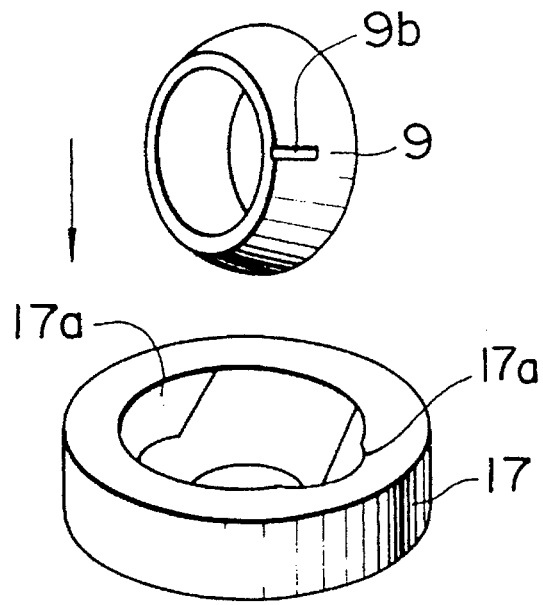
FIGS. 10–12 are oblique projection views showing assembling steps of the bearing housing and a bearing.
Figure 11:
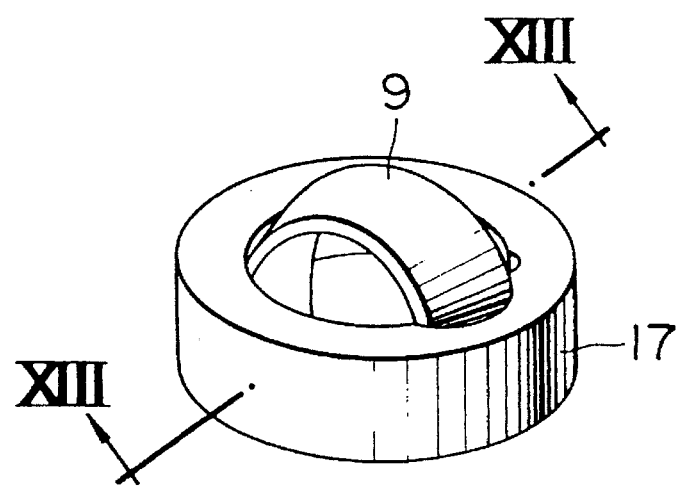
Figure 12:
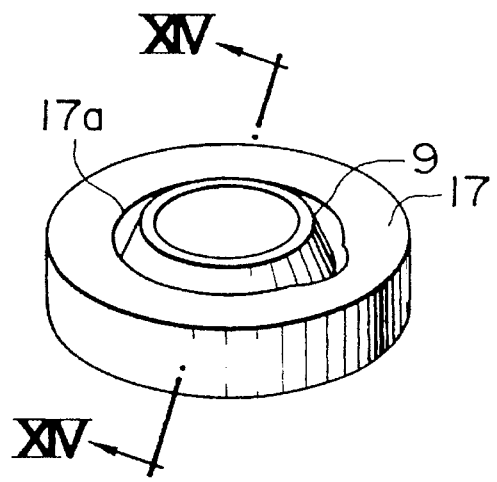
Figure 13:
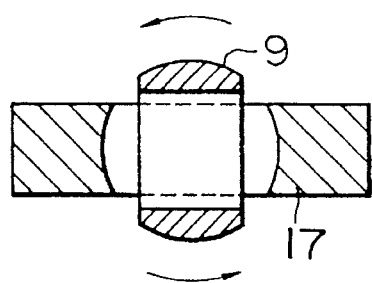
FIG. 13 is a cross sectional view taken along a line XIII—XIII in FIG. 11.
Figure 14:
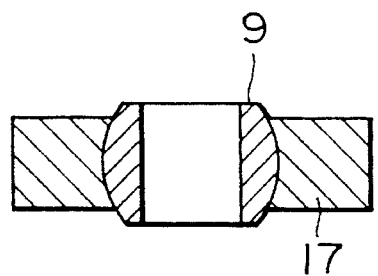
FIG. 14 is a cross sectional view taken along a line XIV—XIV in FIG. 12.

The bearing housing 17 has grooves 17a opening to the relatively low pressure chamber 42 and prevented from opening to the relatively high pressure chamber 41, as shown in FIGS. 2 and 3. The grooves 17a are substantially symmetrical relative to the axis, a radial width of the grooves 17a is not less than diameters of the spherical outer surface 9a of the bearing 9 and the spherical inner surface 17b of the bearing housing 17, and a circumferential width of the grooves 17a is not less than an axial width of the bearing 9 so that the self-aligning bearing 9 is inserted into the inner surface 17b of the bearing housing 17 through the grooves 17a as shown in FIGS. 10–14 and the lubricant flows into a radially outermost portion 17d of the inner surface 17b through the grooves 17a. The bearing housing 17 has a coaxial hole 17c whose diameter is not less than the diameters of the spherical outer surface 9a and the spherical inner surface 17b to form a part of the relatively low pressure chamber 42, as shown in FIG. 6. The outer surface 9a may include lubricant grooves 9b, as shown in FIG. 10.

Figure 4:
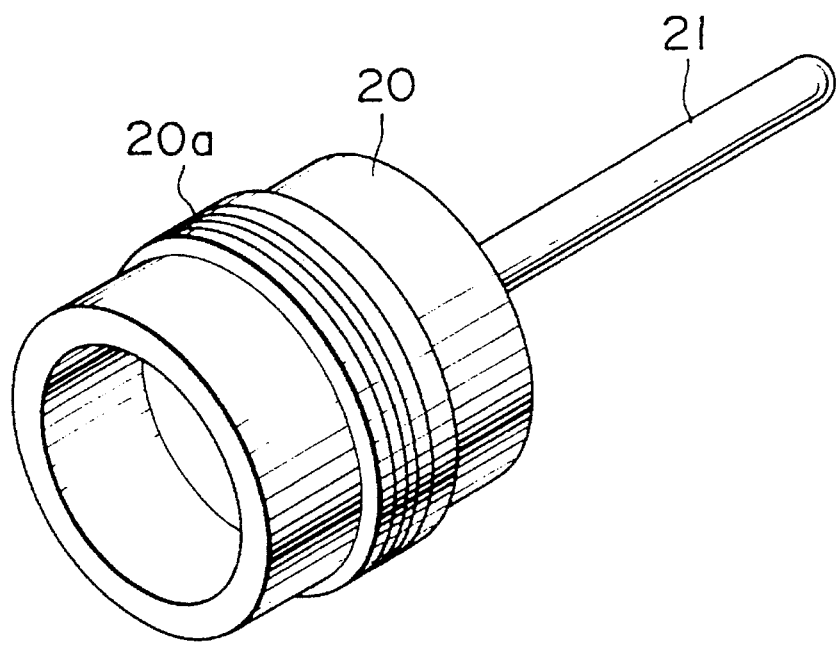
FIG. 4 is an oblique projection view of a bearing housing lid according to the present invention.
Figure 5:
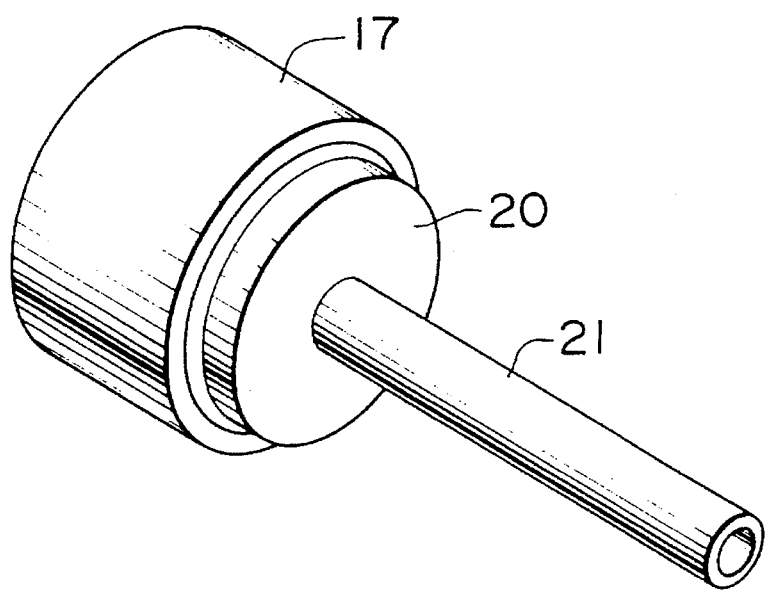
FIG. 5 is another oblique projection view of the bearing housing lid according to the present invention.

The bearing housing lid 20 has a thread 20a mating with a thread formed on the coaxial hole 17c, and the pipe 21 and the thread 20a are coaxial, as shown in FIGS. 4 and 5, so that positional relationships between the pipe 21 and the bearing housing lid 20 and between the pipe 21 and the spherical inner surface 17b are not changed by rotational positions of the bearing housing lid 20 on the bearing housing 17 and of the bearing housing 17 on the frame 16. Therefore, the pipe 21, the bearing housing lid 20, the bearing housing 17, the bearing 9 and the shaft 6 are always coaxial regardless of the rotational positions of the bearing housing lid 20 and the bearing housing 17. The hole 17c is hermetically sealed by a seal 23 compressed between the bearing housing lid 20 and the bearing housing 17.

Figure 7:
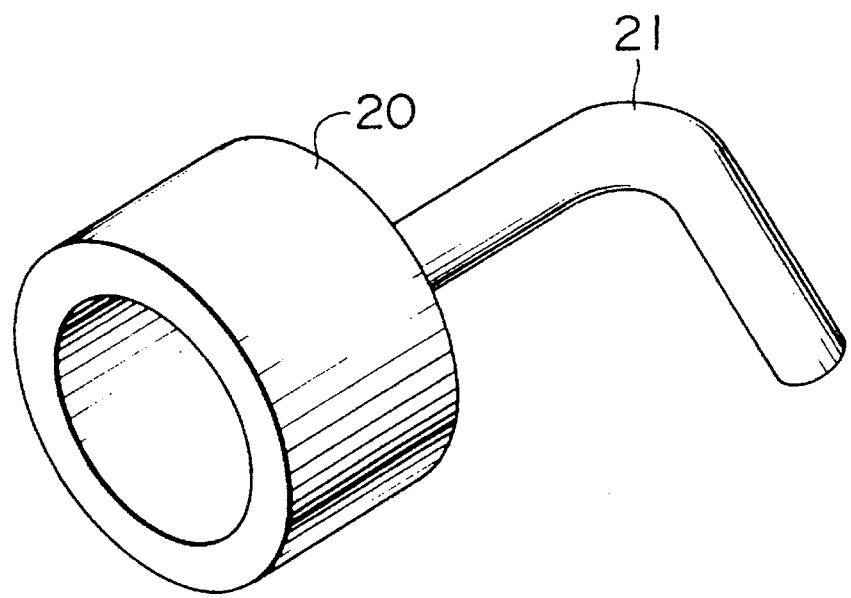
FIG. 7 is an oblique projection view of another bearing housing lid according to the present invention.
Figure 8:
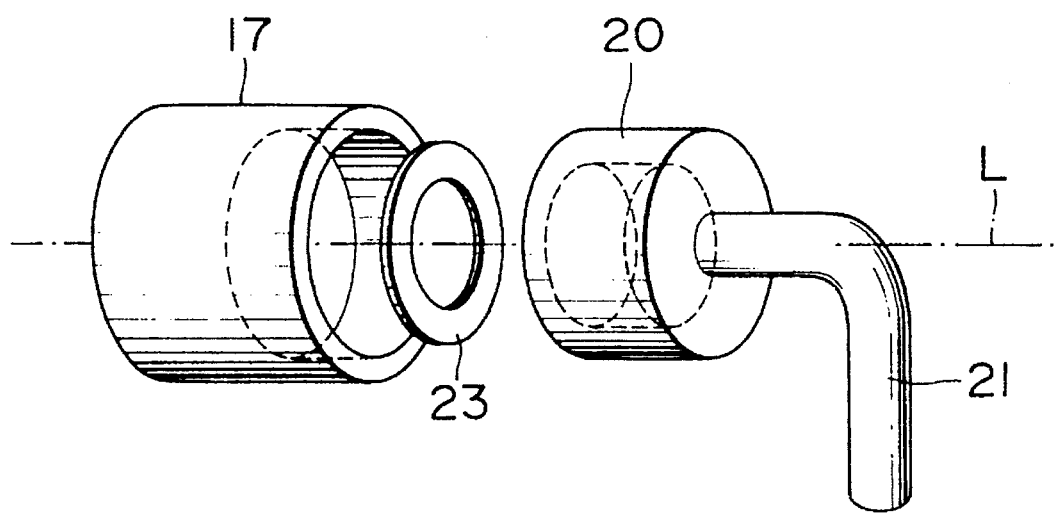
FIG. 8 is an oblique projection view of components of the another bearing housing lid shown in FIG. 7.
Figure 9:
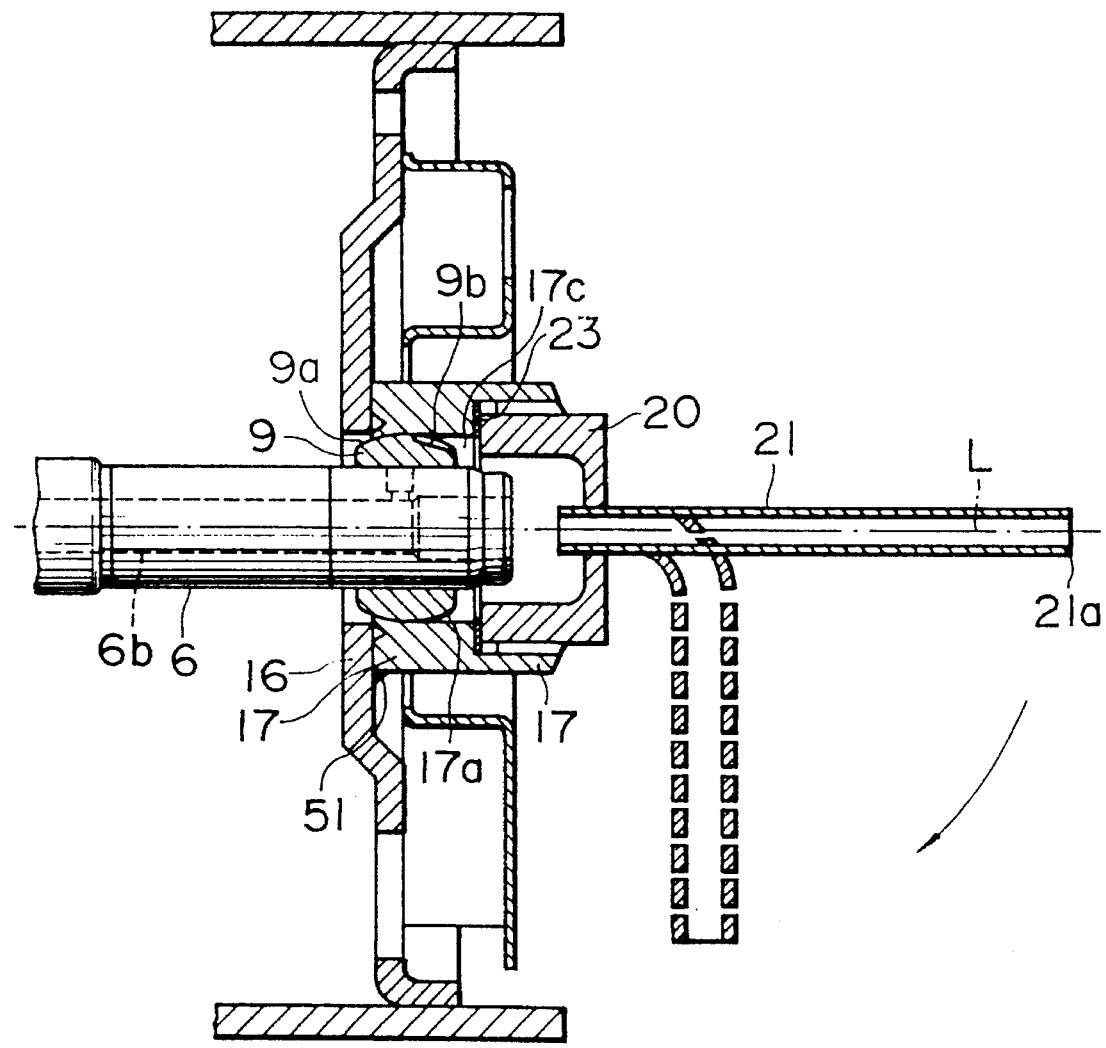
FIG. 9 is a cross sectional view of a rear bearing structure according to the present invention.

After the bearing housing lid 20 is screwed into the bearing housing 17 to be fixed thereto, the pipe 21 is bent to form a horizontally extending part, a bent part and a vertically extending part thereof as shown in FIG. 9, so that a terminating or lower end 21a of the vertically extending part reaches securely the lubricant contained by the relatively low pressure chamber 42. The bearing housing lid 20 without the thread 20a may be fixed to the bearing housing 17 by welding process, as shown in FIGS. 7 and 8.

Figure 15:
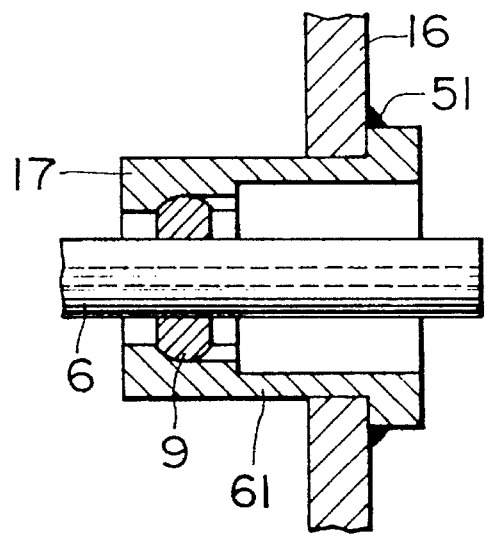
FIG. 15 is a cross sectional view of another bearing housing according to the present invention.
Figure 16:
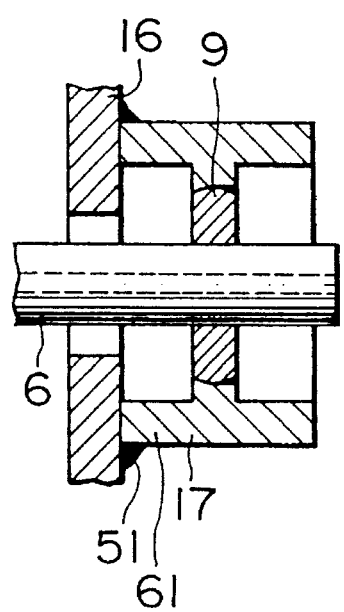
FIG. 16 is a cross sectional view of another bearing housing according to the present invention.
Figure 17:
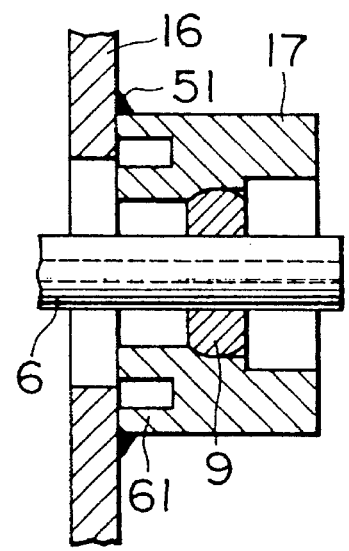
FIG. 17 is a cross sectional view of another bearing housing according to the present invention.
Figure 18:
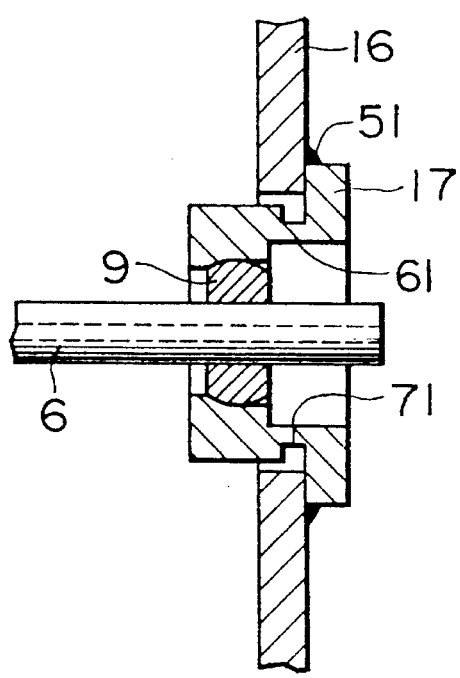
FIG. 18 is a cross sectional view of another bearing housing with a radially opening groove according to the present invention.

The bearing housing 17 is fixed to the frame 16 by spot-welded portions 51, as shown in FIGS. 9 and 15–18. For restraining a transmission of deformation and/or heat energy from a part of the bearing housing 17 with the welded portions 51 thereon to the spherical inner surface 17b, a diameter and/or cross-sectional-area of the part of the bearing housing 17 is larger than that of a related flexible intermediate or thermal conduction throttle part 61 of the bearing housing 17 between the radially outermost portion 17d of the inner surface 17b and the welded portions 51 as shown in FIGS. 15 and 18, a cross-sectional-area and/or geometrical moment of inertia of area against a bending moment force around an axis transverse to the rotational axis of the rotational shaft 6 of the intermediate part 61 is less than that of another part of the bearing housing 17 with the radially outermost portion 17d thereon as shown in FIGS. 15–18, the cross-sectional-area and/or geometrical moment of inertia of area against the bending moment force around the axis transverse to the rotational axis of the rotational shaft 6 of the intermediate part 61 is less than that of the part of the bearing housing 17 as shown in FIGS. 15 and 18, a radially opening groove (preferably circumferential) 71 is arranged at the intermediate part 61 as shown in FIG. 18, and/or the welded portions 51 are prevented from being arranged within an axial width of at least one of the spherical inner surface 17b and the spherical outer surface 9a as shown in FIGS. 15–18.

What is claimed is:

1. A compressor for compressing a fluid, comprising:

a rotational shaft, a compression mechanism including a pair of compression members, at least one of which is driven by the rotational shaft to decrease a volume formed between the compression members so that the fluid in the volume is pressurized, a relatively high pressure chamber receiving the pressurized fluid discharged from the compression mechanism, and lubricant, a relatively low pressure chamber whose inner pressure is lower than that of the relatively high pressure so that the lubricant flows from the relatively high pressure chamber into the relatively low pressure chamber, a self-aligning rotational bearing supporting the rotational shaft therein and including a spherical outer surface, one of the axial ends of the self-aligning rotational bearing facing to the relatively high pressure chamber, and another one of axial ends of the self-aligning rotational bearing facing to the relatively low pressure chamber, a self-aligning bearing housing including a spherical inner surface in which the spherical outer surface fits in a slidable manner, and a groove formed on at least one of the spherical inner and outer surfaces, which groove opens to the relatively low pressure chamber and extends as far as a contact area between the spherical inner and outer surfaces, the contact area preventing the groove from opening to the relatively high pressure chamber.

2. A compressor according to claim 1, wherein the groove is formed on the spherical inner surface and a radial distance between the groove and a rotational axis of the rotational shaft is decreased from the relatively low pressure chamber toward a radially outermost portion of the spherical inner surface.

3. A compressor according to claim 1, further comprising a plurality of the grooves substantially symmetrical relative to the rotatational axis.

4. A compressor according to claim 1, wherein the rotational axis extends substantially horizontally.

5. A compressor according to claim 1, wherein the bearing housing includes a hole whose diameter is not less than a radially outermost diameter of the spherical inner surface to keep a fluidal communication through the hole between the groove and the relatively low pressure chamber.

6. A compressor according to claim 1, wherein the groove extends to a radially outermost portion of the spherical inner surface.

7. A compressor according to claim 1, wherein the groove extends substantially parallel to a rotational axis of the rotational shaft.

8. A compressor for compressing a fluid, comprising:

a rotational shaft extending in an axial direction;

a compression mechanism including a pair of compression members, at least one of which is driven by the rotational shaft to decrease a volume formed between the compression members so that the fluid in the volume is pressurized, a self-aligning rotational bearing supporting the rotational shaft therein and including a spherical outer surface, a self-aligning monolithic bearing housing including a spherical inner surface in which the spherical outer surface fits in a slidable manner, a container receiving the rotational shaft, the compression mechanism, the self-aligning rotational bearing and the self-aligning bearing housing, a support plate connecting the container and the self-aligning bearing housing, and a welded portion between the support plate and the self-aligning bearing housing, wherein the welded portion is provided at a region displaced from at least one of the spherical inner and outer surfaces in the axial direction.

9. A compressor for compressing a fluid, comprising, a rotational shaft, a compression mechanism including a pair of compression members, at least one of which is driven by the rotational shaft to decrease a volume formed between the compression members so that the fluid in the volume is pressurized, a self-aligning rotational bearing supporting the rotational shaft therein and including a spherical outer surface, a self-aligning bearing housing including a spherical inner surface in which the spherical outer surface fits in a slideable manner, a container receiving the rotational shaft, the compression mechanism, the self-aligning rotational bearing and the self-aligning bearing housing, a support plate connecting the container and the self-aligning bearing housing, and a welded portion between the support plate and the self-aligning bearing housing, wherein the self-aligning bearing housing has a flexible portion between the welded portion and a radially outermost portion of the spherical inner surface, a geometrical moment of inertia of area of the self-aligning bearing housing against a bending moment force around a transverse axis of a rotational axis of the rotational shaft at the flexible portion being smaller than a geometrical moment of inertia of area of the self-aligning bearing housing against the bending moment force around the transverse axis at the radially outermost portion of the spherical inner surface.

10. A compressor for compressing a fluid, comprising, a rotational shaft, a compression mechanism including a pair of compression members, at least one of which is driven by the rotational shaft to decrease a volume formed between the compression members so that the fluid in the volume is pressurized, a self-aligning rotational bearing supporting the rotational shaft therein and including a spherical outer surface, a self-aligning bearing housing including a spherical inner surface in which the spherical outer surface fits in a slideable manner, a container receiving the rotational shaft, the compression mechanism, the self-aligning rotational bearing and the self-aligning bearing housing, a support plate connecting the container and the self-aligning bearing housing, and a welded portion between the support plate and the self-aligning bearing housing, wherein the self-aligning bearing housing has a groove opening radially between the welded portion and a radially outermost portion of the spherical inner surface.

11. A compressor according to claim 10, wherein the groove is arranged between the welded portion and an axial end of the spherical inner surface.

12. A compressor for compressing a fluid, comprising, a rotational shaft, a compression mechanism including a pair of compression members, at least one of which is driven by the rotational shaft to decrease a volume formed between the compression members so that the fluid in the volume is pressurized, a self-aligning rotational bearing supporting the rotational shaft therein and including a spherical outer surface, a self-aligning bearing housing including a spherical inner surface in which the spherical outer surface fits in a slideable manner, a container receiving the rotational shaft, the compression mechanism, the self-aligning rotational bearing and the self-aligning bearing housing, a support plate connecting the container and the self-aligning bearing housing, and a welded portion between the support plate and the self-aligning bearing housing, wherein the self-aligning bearing housing has a thermal conduction throttle portion between the welded portion and a radially outermost portion of the spherical inner surface, a cross sectional area of the self-aligning bearing housing along an imaginary radial plane at the thermal conduction throttle portion being smaller than a cross sectional area of the self-aligning bearing housing along the imaginary radial plane at the radially outermost portion of the spherical inner surface.

13. A compressor for compressing a fluid, comprising, a rotational shaft, a compression mechanism including a pair of compression members, at least one of which is driven by the rotational shaft to decrease a volume formed between the compression members so that the fluid in the volume is pressurized, a self-aligning rotational bearing supporting the rotational shaft therein and including a spherical outer surface, a self-aligning bearing housing including a spherical inner surface in which the spherical outer surface fits in a slideable manner, a container receiving the rotational shaft, the compression mechanism, the self-aligning rotational bearing and the self-aligning bearing housing, a support plate connecting the container and the self-aligning bearing housing, and a welded portion between the support plate and the self-aligning bearing housing, wherein the self-aligning bearing housing has a thermal conduction throttle portion between the welded portion and a radially outermost portion of the spherical inner surface, a cross sectional area of the self-aligning bearing housing along the imaginary radial plane at the thermal conduction throttle portion is smaller than a cross sectional area of the self-aligning bearing housing along the imaginary radial plane at the welded portion.

14. A compressor for compressing a fluid, comprising, a rotational shaft whose rotational axis extends substantially horizontally, a compression mechanism including a pair of compression members, at least one of which is driven by the rotational shaft to decrease a volume formed between the compression members so that the fluid in the volume is pressurized, a rotational bearing supporting the rotational shaft therein and including an outer surface, a bearing housing including an inner surface in which the outer surface fits, and a bearing housing lid covering an end of the bearing housing an including a pipe communicating fluidally with the inner surface to supply a lubricant to the inner surface through the pipe, the pipe including a substantially horizontally extending part, wherein the bearing housing lid has a fitting surface substantially symmetrical relative to a longitudinal axis of the lid, the bearing housing has another fitting surface substantially symmetrical relative to a longitudinal axis of the bearing housing, the fitting surface and the another fitting surface contact each other to position the bearing housing lid radially relative to the bearing housing, and the longitudinal axes of the lid and bearing housing and the substantially horizontally extending part of the pipe are substantially coaxial.

15. A compressor according to claim 14, wherein the longitudinal axis and the rotational axis are substantially coaxial.

16. A compressor according to claim 14, wherein the pipe has a substantially vertically extending part and a plastically bent part between the substantially vertically extending part and the substantially horizontally extending part.

17. A compressor according to claim 14, wherein the rotational shaft has a lubricant path therein for supplying the lubricant to the compression mechanism, and the lubricant path and the substantially horizontally extending part of the pipe are substantially coaxial.

* * * * *